CAPACITIVELY COUPLED MULTISECTION CRYSTAL FILTER

Filed April 6, 1967

INVENTOR
F. R. BIES
BY R. B. Ardis
ATTORNEY

United States Patent Office 3,456,214

Patented July 15, 1969

3,456,214

CAPACITIVELY COUPLED MULTISECTION CRYSTAL FILTER

Frank R. Bies, Atkinson, N.H., assignor to Bell Telephone Laboratories, Incorporated, Murray Hill and Berkeley Heights, N.J., a corporation of New York Filed Apr. 6, 1967, Ser. No. 628,921
Int. Cl. H03h 7/08
U.S. Cl. 333—72 3 Claims

ABSTRACT OF THE DISCLOSURE

The individual sections of a multisection crystal filter are coupled together by means of capacitors, thereby allowing the replacement of complex hybrid transformers with simple, easily and predictably manufactured balanced inductors to provide for easier control of the filter characteristics together with better filter element values.

BACKGROUND OF THE INVENTION

This invention relates to electromagnetic wave filters and, more specifically, to multisection piezoelectric crystal bandpass filters.

In certain electronic circuit applications as, for instance, in telephone transmission systems, bandpass filters are required to select and pass on intelligence which is within a predetermined frequency band while rejecting all other transmissions which are outside of this frequency band. In order to obtain a high degree of selectivity, piezoelectric crystals have been incorporated advantageously into such bandpass filters.

One particularly advantageous type of crystal bandpass filter is an unbalanced crystal filter which utilizes a hybrid coil and which requires only one crystal element instead of the four crystals which are generally required in a balanced lattice filter section. Since the crystals required for a lattice section must have essentially identical operating characteristics, that is, they must be matched, the reduction from four crystals for the lattice section to only one crystal for the hybrid type crystal filter results in considerable technical as well as economical advantages.

In order to obtain special filter characteristics, such as a particular bandwidth or frequency discrimination, it may however be necessary to connect two or more of the hybrid type crystal filter sections in tandem. Although these multisection hybrid type crystal bandpass filters require fewer crystals, facilitate impedance matching, and allow the use of more readily realizable circuit elements, they have inherent shortcomings. One particularly detrimental aspect of such multisection hybrid type crystal filters is the complexity of the hybrid transformer. Because of this complexity, hybrid transformers are a source of manufacturing difficulties and they present reliability as well as predictability problems. In addition, hybrid transformers cannot be economically manufactured to the required standards of accuracy, so that crystal filters incorporating such hybrid transformers generally require etxensive adjustments to bring the overall filter performance within the required limits.

A primary object of the invention is to simplify multisection hybrid type crystal bandpass filters by eliminating hybrid transformers between individual filter sections.

Another object of the invention is to increase the reliability of multisection hybrid type crystal bandpass filters.

A further object of the invention is to increase performance predictability of multisection hybrid type crystal bandpass filters.

Still another object of the invention is to decrease the number and the extent of adjustments which are required to bring multisection hybrid type crystal bandpass filters within performance limits.

SUMMARY OF THE INVENTION

To fulfill these objects the invention provides for capacitive coupling between individual sections of a multisection hybrid type crystal bandpass filter, thereby allowing the replacement of complex hybrid transformers with simple balanced inductors.

More specifically, in one embodiment of the invention two unbalanced crystal filter sections are coupled together by two capacitors which, together with two balanced inductors, replace the heretofore required complex hybrid transformers. Since the manufacture of balanced inductors is much simpler than the manufacture of hybrid transformers, the invention considerably increases filter reliability and accuracy. The resulting filters, as a consequence, have a much higher performance predictability and require fewer and less extensive adjustments to be brought within the required performance limits.

DETAILED DESCRIPTION

Figure 1:
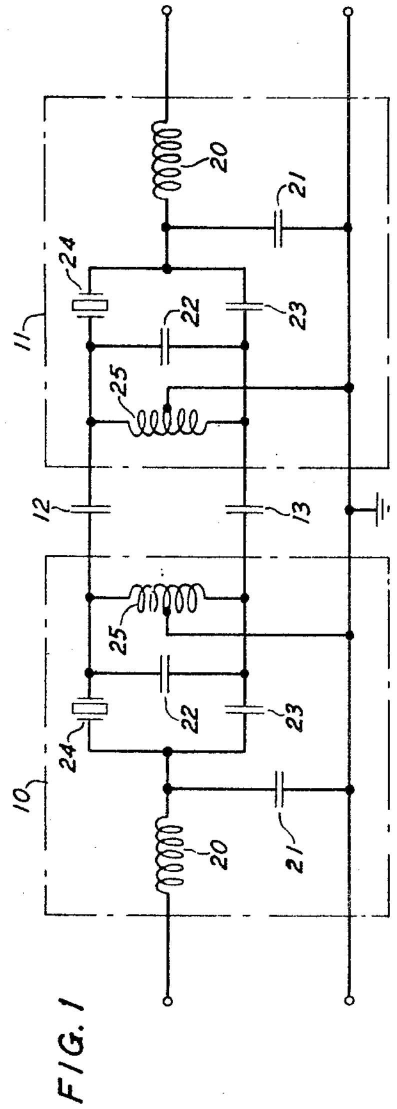
FIG. 1 is a schematic diagram of a dual-section crystal bandpass filter embodying the invention.

The bandpass filter illustrated in FIG. 1 comprises the combination of two individual crystal filter sections 10 and 11 which are coupled together by means of coupling capacitors 12 and 13. The two filter sections 10 and 11, although identical in structure, are connected back-to-back in the circuit by capacitors 12 and 13; that is, filter section 11 is a mirror image of filter section 10. Each of the filter sections 10 and 11 comprises an inductor 20, capacitors 21, 22, and 23, a piezoelectric crystal 24, and a balanced center-tapped inductor 25. One of the input terminals and one of the output terminals of the overall filter are connected directly to a point of common potential, e.g., ground. The center tap of balanced inductor 25 and one terminal of capacity 21 are also connected to the common point of potential. The other terminal of capacitor 81, on the other hand, is connected to the junction point of inductor 20, capacitor 23, and crystal 24. In filter section 10 inductor 20 has its remaining terminal connected to the other input terminal of the overall filter, whereas in filter section 11 the remaining terminal of inductor 20 is connected to the other output terminal. The parallel combination of capacitor 22 and balanced inductor 25 is connected between the remaining terminal of crystal 24 and the remaining terminal of capacitor 23. The overall bandpass filter is completed by coupling the individual filter sections 10 and 11 together by connecting capacitor 12 between the respective junction points of capacitor 22, crystal 24, and inductor 25 in filter sections 10 and 11 and by connecting capacitor 13 between the respective junction points of capacitors 22 and 23, and inductor 25. Piezoelectric crystal 24 and the values of the associated capacitors and inductors are chosen to produce the desired bandpass characteristic as derived from the following design procedure.

Two 180° crystal lattice sections, each having one half of an L-type filter section connected to its respective input and output terminals, form the basic building blocks for the bandpass filter. The capacitors of the end sections are absorbed into their respective crystal lattice section, and the series inductor of the L-section in the output of the first crystal section and the series inductor of the L-section in the input of the second crystal section are converted to shunt inductors. The second crystal filter section, as a result, takes the form of a mirror image of the first crystal filter section, where the shunt inductances of the respective filter sections are facing each other.

The two crystal filter sections are coupled together by inserting a full H-type bandpass filter section between the shunt inductances of the respective crystal filter sections. The use of the H-type filter section with its excellent impedance matching capabilities assures the minimization of reflection and interaction losses between the two crystal filter sections.

Figure 2:
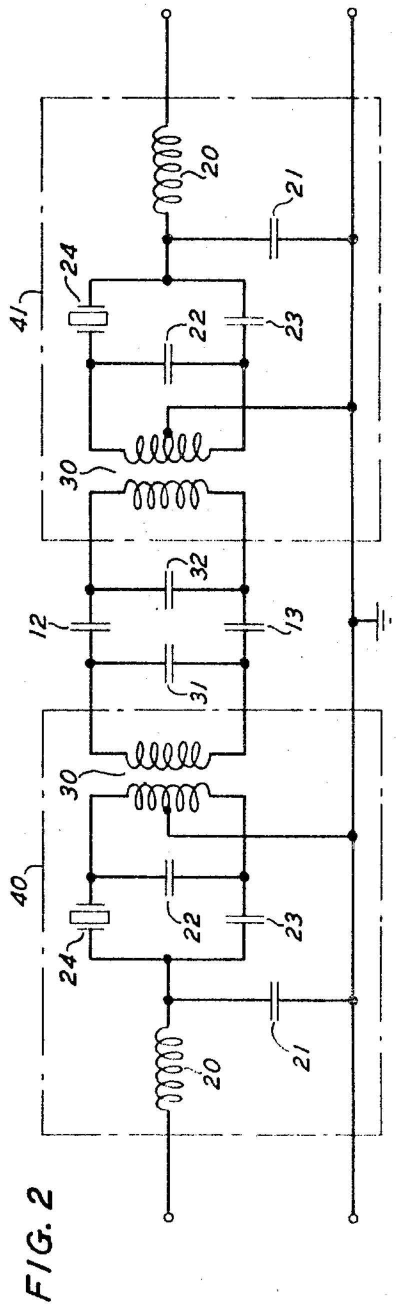
FIG. 2 is a schematic diagram of a crystal bandpass filter which incorporates two hybrid transformers.

In order to realize the inherent advantages of an unbalanced circuit arrangement and to provide for practical circuit element values, the balanced crystal filter sections are transformed into an unbalanced form which requires the use of two hybrid transformers. The resulting composite hybrid type crystal bandpass filter is shown in FIG. 2. The two identical crystal sections 40 and 41 are coupled together from their respective output and input windings of transformers 30 through the full H-type bandpass filter section comprising capacitors 12, 13, 31, and 32. Filter sections 40 and 41 of FIG. 2 are identical to filter sections 10 and 11 of FIG. 1, except for the use of hybrid transformers 30 in filter sections 40 and 41 of FIG. 2.

Because of the complexity of hybrid transformers 30 and the consequent manufacturing difficulties it is, however, highly desirable to eliminate the hybrid transformers from the multisection bandpass filter. The present invention provides therefore for two simple balanced inductors 25 of FIG. 1 to take the place of and accomplish the same functions as heretofore were performed by the hybrid transformers 30 of FIG. 2. In the circuit of FIG. 1 the simple balanced inductors 25, having an inductance approximately equal to the inductance of the parallel combination of the windings of the corresponding transformers 30, are used to replace the complex hybrid transformers 30 of FIG. 2. While capacitors 31 and 32 of FIG. 2 are absorbed into the capacitances of capacitors 22 of filter sections 10 and 11, respectively, capacitors 12 and 13 of the H-type coupling section are retained to provide for direct capacitive coupling between the two filter sections 10 and 11.

The principal feature of the coupling arrangement of the present invention is the replacement of the complex hybrid transformers with simple, easily manufactured, highly reliable, and readily predictable balanced inductors in multisection unbalanced type crystal bandpass filters. The resulting composite bandpass filter, in addition to reflecting all of the individual features associated with the balanced inductor, provides for a variety of other overall improvements such as more easily realizable filter components, better predictability of performance characteristics, the need for fewer and less extensive adjustments to bring the filter within required performance limits, and the capability to improve theoretical filter designs because of the improvement in manufacturing accuracy.

It is to be understood that the embodiment described herein is illustrative of the application of the principles of the invention. Numerous other arrangements may be devised by those skilled in the art without departing from the spirit and scope of the invention.

What is claimed is:

1. A multisection crystal filter which comprises at least a first and a second unbalanced crystal filter section and coupling means to interconnect said filter sections, each of said crystal filter sections having a pair of input terminals and a pair of output terminals, said first filter section having a first inductor connected across its output terminals and said second filter section having a second inductor connected across its input terminals, said coupling means comprising first and second capacitors, said first capacitor connecting one end of said first inductor to one end of said second inductor, said second capacitor connecting the other end of said first inductor to the other end of said second inductor, and means to connect an intermediate terminal of said first inductor, an intermediate terminal of said second inductor, one of said input terminals of said first filter section, and one of said output terminals of said second filter section to a point of common potential.

2. A multisection crystal filter in accordance with claim 1 in which said first and second filter sections each comprise in addition a first capacitor, a second capacitor, and a piezoelectric crystal, said first capacitor and the series combination of said crystal and said second capacitor both being connected in parallel across a respective inductor, the junction point of said crystal and said second capacitor of said first filter section being connected to the other of its input terminals, and the junction point of said crystal and said second capacitor of said second filter section being connected to the other of its output terminals.

3. A multisection crystal filter in accordance with claim 2 in which said first and second filter sections comprise in addition a second inductor and a third capacitor, said third capacitor being connected between said point of common potential and the junction point of said crystal and said second capacitor, said first filter section having its respective second inductor connected between said junction point of said crystal and said second and third capacitors and the other input terminal, and said second filter section having its respective second inductor connected between said junction point of said crystal and said second and third capacitors and the other output terminal.

References Cited

UNITED STATES PATENTS

| | | | |
|---|---|---|---|
| 2,913,682 | 11/1959 | Kosowsky | 333—72 |
| 2,959,752 | 11/1960 | Kosowsky | 333—72 |
| 3,111,636 | 11/1963 | Ma | 333—77 X |

ELI LIEBERMAN, Primary Examiner

T. VEZEAU, Assistant Examiner

U.S. Cl. X.R.

333—76, 77